2,993,034
COPOLYMERS OF VINYL CHLORIDE AND VINYL EPOXYSTEARATE

Daniel Swern, Philadelphia, Pa., assignor to United States of America as represented by the Secretary of Agriculture
No Drawing. Filed June 2, 1955, Ser. No. 512,914
4 Claims. (Cl. 260—87.1)
(Granted under Title 35, U.S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This application is a continuation-in-part of the copending application of Daniel Swern, entitled "Vinyl Epoxystearate," filed July 13, 1954, Serial No. 443,182.

In general according to the invention vinyl epoxystearate is copolymerized with vinyl chloride. The resulting copolymers, containing epoxystearate groups, are both internally plasticized and stabilized against deterioration by the action of heat or sunlight by said groups. Stabilization is achieved with as little as 2 mole percent of epoxystearate in the copolymer. Amounts in the range of 2½ to 5 mole percent effectively lower the milling temperature without substantially affecting the strength and rigidity of the resin at ordinary temperatures while amounts in the range of 10 to 20 mole percent yield increasingly soft and flexible resins. In order to avoid excessive softness and tackiness in the product I generally prefer that the copolymer contain at least about 80 mole percent (50 weight percent) of vinyl chloride. In any case, since the vinyl epoxystearate is an integral part of the polymer chains in the resin, the effects produced are permanent, since the epoxystearate cannot evaporate, exude or migrate from the resin.

The plasticizing effect of vinyl epoxystearate in my copolymers is largely due to the long stearate group, as modified by the epoxy group, while the stabilizing effect is due entirely to the epoxy group. It is evident that the number of stearate groups required for effective plasticization far exceeds the number of epoxy groups required for stabilization of the resin. Hence, it is not necessary that all the stearate groups carry epoxy groups. In other words, I can, and I generally prefer, to copolymerize vinyl chloride with a mixture of vinyl stearate and vinyl epoxystearate rather than with the latter alone. In this way, the exact amount of stearate needed for plasticization can be added independently of the amount of epoxystearate required for stabilization. My preferred composition is thus a three component copolymer of vinyl chloride, vinyl stearate and vinyl epoxystearate.

For the preparation of my copolymers, it is not necessary nor economically desirable to use pure vinyl stearate or epoxystearate. The fatty acids from which the vinyl esters are prepared may suitably be a mixture of oleic and stearic acids in proportions such that after the mixture is converted to vinyl esters and then epoxidized, the product contains vinyl stearate and vinyl epoxystearate in the desired proportions. Moreover, since it has been previously shown that vinyl palmitate is almost as effective as the stearate for the internal plasticization of vinyl chloride resins [copending application of William S. Port, Edmund F. Jordan, Jr., and Daniel Swern, "Flexible Polyvinyl Chloride Copolymers," filed December 11, 1953, Serial No. 397,798], it is obvious that the vinyl stearate used may contain large amounts of vinyl palmitate without significant loss of plasticizing effect. In view of these considerations, it has been found that the preferred source of vinyl esters for carrying out my invention is commercial tallow acids, either directly as obtained by splitting tallow or, if less oleic acid is desired, as single pressed stearic acid or as partially hydrogenated tallow acids. The former is preferred when the vinyl esters are to be used primarily for their stabilizing effect while the latter is preferred when a large plasticizing effect is also desired. Of course, in intermediate cases a mixture of the two may be used. In either case, it has been found that the amount of palmitic and lower saturated acids and of linoleic and other polyunsaturated acids present is insufficient to have any deleterious effect on the product. Other suitable raw materials include the stearin fractions of lard and grease.

The copolymerization of vinyl chloride with vinyl epoxystearate, with or without vinyl stearate being also present, may be carried out in accordance with any of the conventional procedures used for the polymerization or copolymerization of vinyl chloride. Thus, it may be done in aqueous suspension or emulsion, or in solution in an organic solvent, or in bulk. The usual emulsifiers, suspending agents, catalysts, modifiers, regulators, etc., may be used as desired. As a matter of convenience and economy I generally prefer to conduct the polymerization in an aqueous suspension or emulsion with the use of a conventional free radical generating catalyst such as a peroxide or bis-azo compound.

The practice of the invention is illustrated by the following examples.

EXAMPLES 1–5

To a frozen mixture of 400 ml. of a 1% (by weight) aqueous solution of polyvinyl alcohol (M.W., 40,000), 0.274 g. of benzoyl peroxide (0.039 mole percent based on monomer used) and 23.5 g. (2.5 mole percent) of vinyl epoxystearate (4.6–4.9% oxirane oxygen) there was added 176.5 g. of vinyl chloride (97.5 mole percent). The mixture was polymerized in aqueous suspension by tumbling it in a bottle for 48 hrs. at 50° C. The mixture was then poured into water; the polymer was recovered and washed with methanol or petroleum ether to remove any remaining monomer and was then dried at room temperature. The polymer, amounting to 90% yield, had the properties and analyses shown in Table I.

By use of substantially the above procedure vinyl chloride-vinyl epoxystearate monomer mixtures containing 5, 10, 15 and 20 mole percent of epoxystearate were similarly polymerized. The yields of polymer were 85, 79, 62 and 48%, respectively. Properties of the products are shown in Table I.

EXAMPLE 6

A terpolymer of vinyl chloride, vinyl epoxystearate and vinyl stearate was made by substantially the procedure used in the above examples, except that the monomer mixture consisted of vinyl chloride, vinyl epoxystearate and vinyl stearate in the mole ratio of 90:2:8. The yield of polymer was 80% and analysis showed the polymer contained the three components in the mole ratio of 92.4:1.52:6.11, respectively. Analyses are shown in Table I.

EXAMPLE 7

A copolymer of vinyl chloride and vinyl epoxystearate was prepared in aqueous emulsion by mixing 63.4 g. (90 mole percent) of vinyl chloride, 36.6 g. (10 mole percent) of vinyl epoxystearate, 200 ml. of a 2.5 weight percent solution of sodium tetradecyl sulfate in water, 0.1187 g. (0.039 mole percent) of potassium persulfate and 2 g. of sodium chloride and tumbling the mixture in a bottle in a water bath held at 50° C. for 48 hours. The polymer was isolated, purified and analyzed as described above. The yield was 92% and the analyses are shown in Table I.

Table I
ANALYTICAL RESULTS FOR VINYL EPOXYSTEARATE—VINYL CHLORIDE COPOLYMERS

| Example | VES[a]/VCl[b] Monomer Mole Ratio | VES[a]/VCl[b] Polymer Mole Ratio Calc'd From Cl Analysis | Percent Chlorine in Copolymer | | Percent Oxirane Oxygen in Copolymer | | |
|---|---|---|---|---|---|---|---|
| | | | Theory | Found | Direct Oxirane Analysis | Calc'd from Cl Analysis | Calc'd from Monomer Component |
| 1 | 2.5:97.5 | 2.10:97.90 | 50.07 | 51.06 | 0.542 | 0.495 | 0.550 |
| 2 | 5:95 | 4.16:95.84 | 44.57 | 46.31 | 0.899 | 0.907 | 1.00 |
| 3 | 10:90 | 7.34:92.66 | 35.98 | 40.21 | 1.45 | 1.62 | 1.80 |
| 4 | 15.85 | 10.35:89.65 | 29.62 | 35.47 | 1.80 | 1.85 | 2.24 |
| 5 | 20:80 | 15.53:84.47 | 24.69 | 29.03 | 2.83 | 2.41 | 2.65 |
| 6 | [c] 2:90 | [d] 1.52:92.37 | 36.44 | 39.72 | 0.30 | | 0.35 |
| 7 [e] | 10:90 | 9.25:90.75 | 35.98 | 37.10 | 1.65 | 1.71 | 1.80 |

[a] Vinyl epoxystearate.
[b] Vinyl chloride.
[c] 8 mole percent vinyl stearate.
[d] 6.11 mole percent vinyl stearate.
[e] Emulsion copolymer.

The polymers of Examples 1–7 were compared with pure polyvinyl chloride and with 95:5 (ratio by weight) polyvinyl chloride-acetate copolymer, with and without conventional stabilizers and external plasticizers, to determine the stabilizing and plasticizing effects of the vinyl epoxystearate and vinyl stearate incorporated therein.

Table II shows the milling and molding temperatures of the polymers obtained as described in Examples 1–7 as well as similar data for polyvinyl chloride, with and without a conventional plasticizer, and a 95:5 (ratio by weight) copolymer of vinyl chloride and vinyl acetate. The three latter materials had such high softening temperatures and such poor heat stability that they could not be milled or molded without a stabilizer having been added. Accordingly, each of these three contained 1% lead carbonate.

Table II
PROPERTIES OF POLYMERS

| Polymers of Ex. No. | Milling Temp., °F. | Molding Temp., °F. | Clash-Berg[a] Temp., °C. | Tensile Properties | | |
|---|---|---|---|---|---|---|
| | | | | Tensile, p.s.i. | Elongation, percent | 100% Modulus, p.s.i. |
| 1 | 270 | 290 | | | | |
| 2 | 250 | 270 | | | | |
| 3 | 230 | 250 | 19 | | | |
| 3 | 200 | 250 | −1 | 2,100 | 280 | 1,370 |
| 5 | 110 | 250 | −32 | | | |
| 6 | 235 | 265 | −2 | 2,610 | 220 | 2,040 |
| 7 | 220 | 265 | | | | |
| PVCA [b] | 320 | 340 | | | | |
| PVC [c] | 350 | 370 | | | | |
| PVC+35 weight percent DOP [d] | 320 | 340 | −28 | 3,000 | 320 | 1,300 |

[a] Temp. at which the torsional modulus is 135,000 p.s.i. (Clash-Berg T-200).
[b] Polyvinyl chloride-acetate (95:5, ratio by weight) copolymer.
[c] Polyvinyl chloride.
[d] Dioctyl phthalate plasticizer.

From the above and other similar experiments it was found that as little as 2 mole percent of vinyl epoxystearate in polyvinyl chloride resins exerts a significant stabilizing effect against deterioration by the action of heat or light. Similarly, as little as 2 mole percent showed considerable plasticizing effect by lowering the milling and molding temperature. When as much as about 5 mole percent was used, the addition of conventional epoxy type stabilizers had no additional stabilizing effect, though lead carbonate did show some effect. When 10 mole percent or more of vinyl epoxystearate was used, the plasticizing effect was so great that the product was rubbery and flexible at room temperature as well as at sub-zero temperatures.

Accelerated heat aging tests were run on many samples including those shown in Table II. In these tests, samples of the resins were heated in an oven at 160° C. (320° F.) and examined periodically for discoloration. The controls (the last 3 materials listed in Table II) were badly discolored in milling and molding and quickly turned black in the oven. The same materials containing 1 weight percent of lead carbonate were reasonably stable and blackened only after 1–4 hours in the oven. The polymers of Examples 1–7 showed a stability substantially in proportion to the percentage of vinyl epoxystearate. In the absence of lead carbonate or other stabilizer the polymer of Example 1 showed little heat discoloration under 1 hour in the oven and remained transparent up to 2 hours. The corresponding times for the polymer of Example 2 were 1½ and 3 hours respectively while those of Example 3 were 2 and 5 hours respectively. The product of Example 4 was a light yellow color after 2 hours in the oven, light amber at 4 hours and dark amber at 8 hours.

Light stability tests on the various materials of Table II were made by exposing samples to a carbon arc light at 80° C. for 48 hours. The unstabilized controls were badly discolored while the materials of Examples 1–7 were not discolored but were actually bleached if they initially showed color.

An unusual property of great potential value possessed by the copolymers of this invention is that of being cross-linked or vulcanized by the action of polyfunctional reagents that react with epoxy groups. Examples of such reagents are polycarboxylic acids, anhydrides or amides, polyamines, polyphenols and glycols.

The vinyl epoxystearate used as the comonomer in the herein described copolymerizations may be prepared by epoxidizing vinyl oleate. In general, in carrying out the epoxidation, vinyl oleate is dissolved in a suitable solvent and treated with an organic peracid or a reagent that produces such a peracid in situ. The epoxidation proceeds smoothly at ordinary temperatures and is complete in a few hours. The vinyl epoxystearate is then recovered by any suitable means, such as evaporation of the solvent or dilution with water.

The solvent may be any that will dissolve the reagents and is inert toward them, such as carbon tetrachloride, benzene, dioxane, ethyl acetate or acetone. It may also be the acid corresponding to the peracid used as a reagent, provided the acid is a liquid with suitable solvent properties. The preferred class of solvents consists of the saturated lower aliphatic monocarboxylic acids, particularly formic and acetic acid. These acids are solvents for the reagents and the product; they are readily removed from the product by vacuum distillation or washing with water; they are readily available and are inexpensive.

Acetic and formic acids are especially suitable solvents for use when the peracid reagent is to be formed in situ by the reaction of hydrogen peroxide with an organic acid. In such cases, the formic or acetic acid serves both as a solvent and as a reagent to react with the hydrogen peroxide to form the corresponding peracid.

The epoxidation of vinyl oleate is illustrated by the following example:

One hundred and eighty-five grams (1 mole) of commercial 40% peracetic acid was treated with 20 g. of sodium acetate trihydrate to neutralize any sulfuric acid which it might contain. The resulting neutralized peracid was diluted to 250 ml. with acetic acid and then it was slowly added at 30° C. with stirring to 308 g. (1 mole) of vinyl oleate diluted to 750 ml. with acetic acid. After about 2½ hours reaction at 30°, analysis indicated that consumption of peracid had virtually ceased, and the reaction mixture was poured into about 2 liters of water. The upper oily layer was washed successively with water, dilute sodium bicarbonate solution and water.

The yield of crude vinyl epoxystearate was 315 g. (calculated, 324 g.). Its oxirane oxygen content was 4.16% (calculated 4.9%). The conversion, therefore, was about 85%.

Substantially pure vinyl epoxystearate was obtained by recrystallization of the crude product from acetone at −30°. The resulting product had an oxirane oxygen content of 4.74% and a refractive index at 30° (D line of sodium) of 1.453. Replacement of the peracetic acid used above with an equivalent amount of performic or perbenzoic acid or $H_2O_2$ did not significantly affect the results.

I claim:

1. An internally stabilized and plasticized vinyl chloride resin comprising a copolymer of at least about 80 mole percent vinyl chloride and at least about 2 mole percent vinyl 9,10-epoxystearate.

2. An internally stabilized and plasticized vinyl chloride resin comprising a copolymer or vinyl stearate, at least about 80 mole percent of vinyl chloride, and at least about 2 mole percent of vinyl 9,10-epoxystearate.

3. A copolymer of vinyl chloride and vinyl 9,10-epoxystearate containing about 5 mole percent of vinyl 9,10-epoxystearate.

4. A copolymer of vinyl chloride and vinyl 9,10-epoxystearate, said copolymer containing at least 50% by weight of polymerized vinyl chloride.

References Cited in the file of this patent

UNITED STATES PATENTS

| | | |
|---|---|---|
| 2,462,422 | Plambeck | Feb. 22, 1949 |
| 2,595,619 | Voorthuis | May 6, 1952 |
| 2,680,109 | Stevens et al. | June 1, 1954 |

OTHER REFERENCES

Witnauer et al.: "Product and Process Dev.," vol. 47, No. 11, pp. 2304–2310.